United States Patent [19]

Woolley et al.

[11] Patent Number: 4,557,581

[45] Date of Patent: Dec. 10, 1985

[54] FULL-FRAME SHORT FOCAL LENGTH IMAGING SYSTEM

[75] Inventors: Warren H. Woolley, Pittsford; William L. Lama, Webster; James D. Rees, Pittsford; John A. Durbin, Webster, all of N.Y.

[73] Assignee: Xerox Corporation, Stamford, Conn.

[21] Appl. No.: 637,657

[22] Filed: Aug. 3, 1984

[51] Int. Cl.⁴ ............................................. G03B 27/00
[52] U.S. Cl. ......................................... 355/1; 355/67; 350/96.25; 350/413
[58] Field of Search ................................ 355/67, 1, 50; 350/96.24, 96.25, 96.27, 413, 96.31; 354/5

[56] References Cited

U.S. PATENT DOCUMENTS

| | | | |
|---|---|---|---|
| 3,655,284 | 4/1972 | Agliata | 355/50 X |
| 4,168,900 | 9/1979 | Adachi | 355/1 |
| 4,447,126 | 5/1984 | Heidrich et al. | 355/1 X |

*Primary Examiner*—L. T. Hix
*Assistant Examiner*—Della Rutledge

[57] ABSTRACT

A compact, two-dimensional full-frame document illumination and imaging device is formed by combining a short focal length imaging area array, such as a gradient index fiber lens area array, with a light source formed in the fiber interstitial areas of the array. The light source is addressed to provide a uniform illumination level at a document platen interface. The full document image is reflected back to the array and projected onto a photosensitive image plane.

11 Claims, 5 Drawing Figures

FULL-FRAME SHORT FOCAL LENGTH IMAGING SYSTEM

BACKGROUND OF THE INVENTION

The present invention relates generally to an illumination and imaging system for a full-frame document reproduction machine and, more particularly, to an integral assembly which combines a full-frame document illumination source and an array of short focal length projection lenses.

Prior art full-frame document illumination and imaging systems generally employ a flash lamp combined with a conventional projection lens to provide full-frame exposure of a document at a photosensitive image plane. Representative systems are disclosed in U.S. Pat. Nos. 3,697,177 (Booth) and 4,333,723 (Green et al). These prior art systems offer relatively fast throughput compared to the conventional scan/rescan systems but the flash and projection lens components are relatively expensive. These full-frame flash systems also have relatively long total conjugates and require sizeable housing units to enclose the system components.

There are many document reproduction applications which would benefit from a relatively inexpensive, full-frame, illumination system combined with a short conjugate imaging system. Heretofore, this configuration has not been possible. Short focal length projection, or transmission, systems are known in the art in a linear scan configuration wherein a lamp/lens assembly is moved relative to a document in an object plane to produce a line-by-line flowing image at a photoconductive image plane. U.S. Pat. No. 3,544,190 discloses a system where a moving lens strip imaging system scans beneath a fixed document platen. In U.S. Pat. No. 3,947,106, the imaging array is comprised of a plurality of gradient index optical fibers bundled into a two-row configuration. For these prior art scan systems, linear lamps are used to incrementally illuminate a document placed at the object plane.

A full-frame, two-dimensional microlens configuration has been disclosed in a paper presented July 4, 1983 at the 4th Topical Meeting On "Gradient-Index Optical Imaging Systems". This paper is printed on pages 224–227 of the Technical Digest of that conference. This article does not disclose any practical way to utilize such a lens in a document reproduction device since there is no means for providing the requisite document illumination. It would be desirable to combine the high throughput characteristic associated with full-frame illumination systems with the compactness and favorable economics associated with short focal length imaging systems. This objective has been realized in the present invention by forming a short focal length imaging system as a full-frame array and integrating an illumination source into the body of the array. This configuration, when appropriately positioned beneath a document platen, permits the entire document to be illuminated in a full-frame illumination mode. Reflected light is then projected by the full-frame lens array onto the surface, for example, of a flat photoreceptor. More specifically, the present invention is directed towards an imaging system for transmitting an image of a document at an object plane onto a photosensitive image plane, the system including a full-frame imaging and illumination device positioned between said object and image planes, said device comprising:

a plurality of short focal length lens elements assembled to form a full-frame lens array, an addressable light source positioned in at least some of the interstitial spaces separating said lens elements and on the surface of the array adjacent said object plane, and means to activate said light source whereby light produced by said light source is directed to said document, reflected therefrom and projected by said lens array onto said image plane to form a latent image of said document on said image plane.

IN THE DRAWINGS

DESCRIPTION

Figure 1:
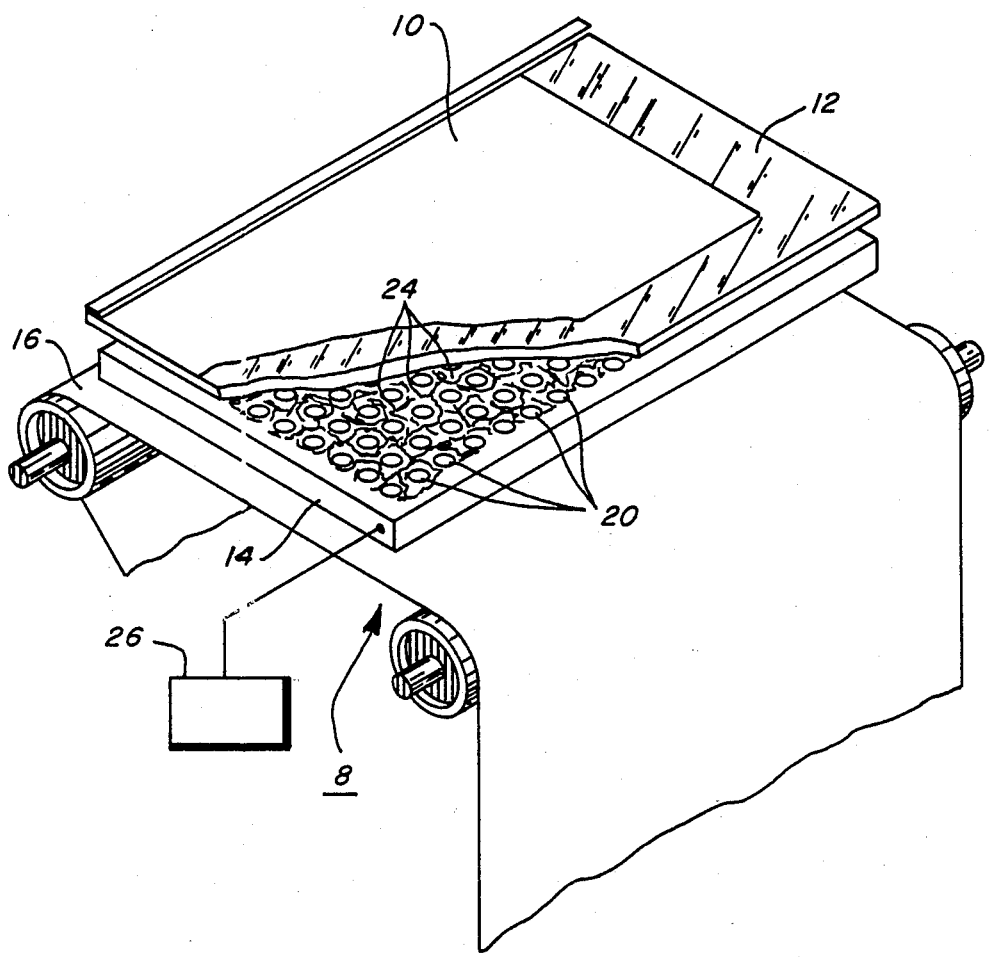
FIG. 1 is a top perspective view of a full-frame, short focal length imaging system according to the present invention.

Referring now to FIG. 1, there is shown a document and illumination imaging system 8. A document 10, lying on an optically transparent platen 12 is imaged by an integral full-frame, two-dimensional gradient index area lens array 14 onto a photoreceptor belt 16. While describing the structure of array 14 in more detail below, for general descriptive purposes, array 14 comprises a plurality of gradient index optical fibers 20. The focusing properties of these fibers are well known in the art and are discussed, for example, in an article entitled "Some Radiometric Properties of Gradient Index Fiber Lenses" by James D. Rees and William L. Lama, *Applied Optics*, April 1980, Vol. 19, No. 7, pp. 1065–1069.

Figure 2:
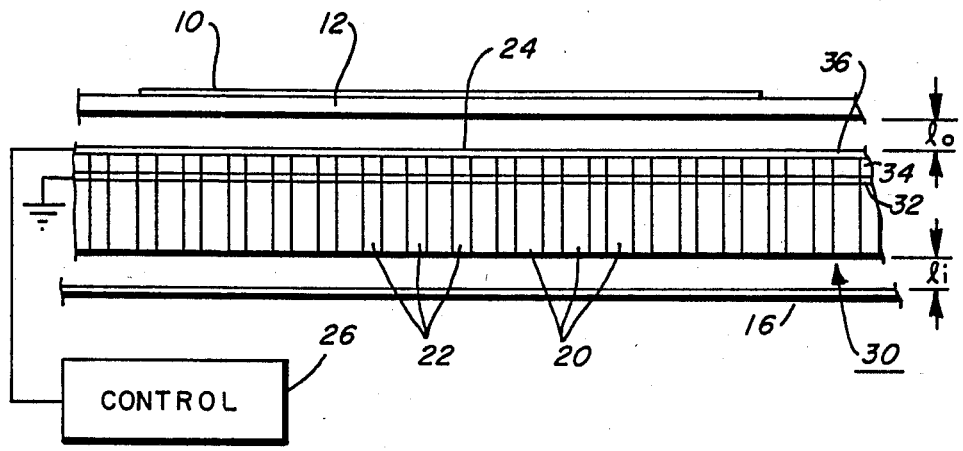
FIG. 2 is an enlarged cross-sectional view of a portion of the imaging array of FIG. 1.

The optical fibers are separated from each other by an inter-fiber spacing material 22 shown in FIG. 2. On the object-side surface of array 14, the interstitial areas between the fibers are covered by a light-emitting layer 24. Layer 24 is electrically connected to a suitable control source 26. Array 14, positioned equidistant between platen 12 and photoreceptor 16 ($l_o = l_i$ in FIG. 2) provides a 1:1 reproduction of document 10 at the surface of belt 16. In operation, a signal, applied by control 26, activates layer 24. The light from layer 24 creates a uniform level of illumination at the platen/document interface. The light is reflected from document 10 and is projected by fibers 20 as a number of overlapping erect images to form a latent image of the document on belt 16. The inter-fiber spacing parameter is selected so that the light reflected from document 10 yields a uniform exposure of the image. Belt 16 may be continuously moved, slowed down or stopped during the illumination pulsing, depending on the illumination requirements of the system. The latent image on belt 16 can then be developed, transferred to a recording substrate and the output copy fixed, as is known in the art. These xerographic steps are disclosed, for example, in U.S. Pat. No. 4,318,610 whose contents are hereby incorporated by reference.

Figure 3:
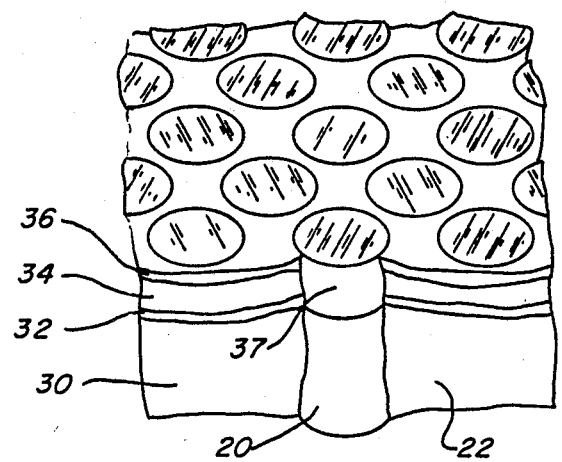
FIG. 3 is an enlarged perspective view of a portion of the array of FIG. 1.

Referring now to FIGS. 2 and 3, layer 24 is connected to the control source 26. The lens/light source array comprises: a first layer 30 consisting of gradient index optical fibers 20 separated from each other by a continuous inter-fiber material 22. Material 22 may be a non-conducting light-absorbing, black resin. A continuous electrode layer 32 overlies the surface of material 22 excepting for the area above the fibers. Layer 32 may be made of any electrically conductive material such as copper or silver. Overlying layer 32 is layer 34 of an electroluminescent material which may be zinc sulfide or a mixture of copper chloride and magnesium-actuated zinc sulfide in a binder. However, any of the well known, electroluminescent phosphors may be utilized and tailored to furnish the desired response and spectral output. Overlying layer 34 is continuous electrode layer 36 comprising a transparent, conductive material such as tin oxide, either alone or on a transparent substrate. Layers 32, 34 and 36 constitute the light-emitting layer 24, shown in FIG. 1. In the area overlying the fibers themselves is formed a plurality of discrete transparent, insulating segments 37.

Electrode 32 is grounded and power source 26 is connected to electrode 36. The electrode and luminescent layers may be formed by known thin film deposition/masking techniques to the desired thickness. Light sources of this type are described, for example, in the text "Lamps and Lighting" edited by S. T. Henderson et al, published by Crane, Russah and Co., 1972.

Figure 4:
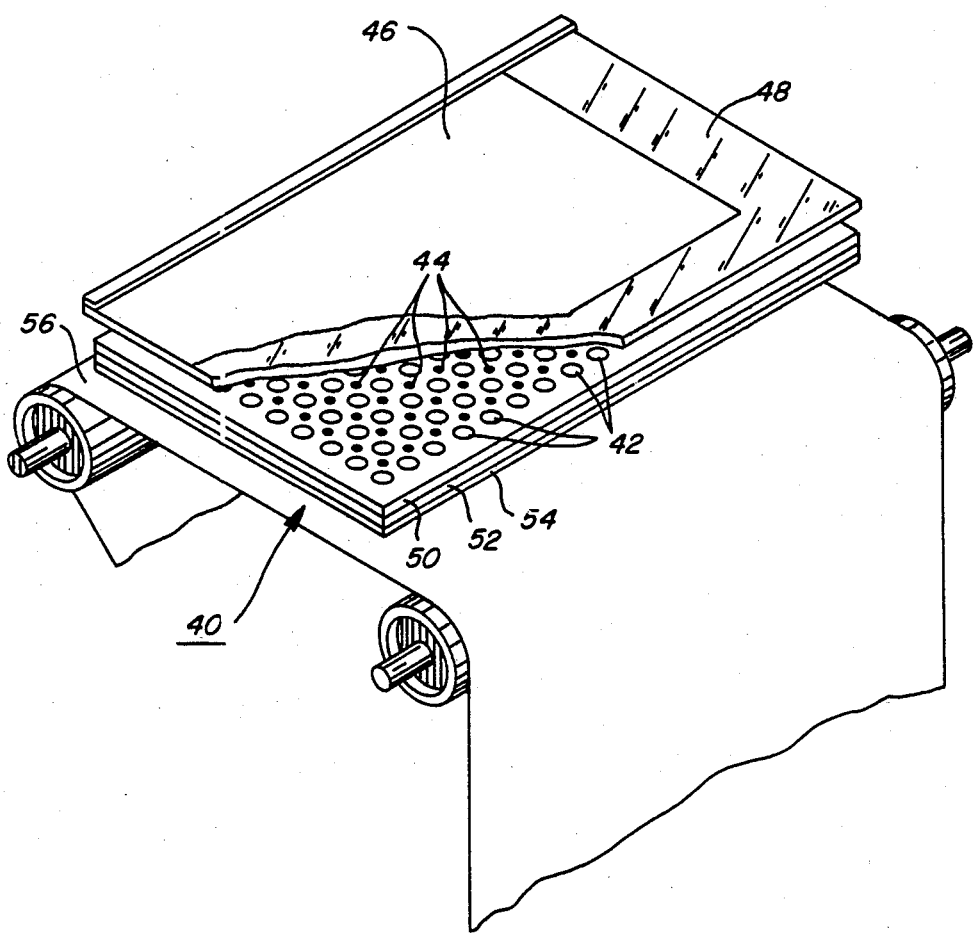
FIG. 4 shows a second embodiment of the lens array of FIG. 1.

Other illumination sources may be placed in the interstitial areas, depending upon the areas available. FIG. 4 shows a second embodiment of the invention wherein light-emitting diodes (LEDs) are used. In this embodiment a lens array 40 comprises a plurality of microlenses 42 formed into a two-dimensional, full-frame array. The array is constructed according to the principles of the previously referenced Yamamato et al article. Interspaced between the interstitial areas are a plurality of LEDs 44 interconnected as a matrix and addressed by a suitable control source (not shown). The operation of this embodiment is the same as for the FIG. 1 embodiment; the LEDs, when pulsed, produce an illumination level at the document 46/platen 48 interface. In this configuration, the microlenses are stacked together in three substrates 50, 52, 54 to produce the erect image at photoreceptor 56.

Other embodiments, consistent with the principles of the invention may be utilized. For example, a monolithic array of vacuum fluorescent segments, or an array of miniature lamps, may also be formed or positioned respectively in the fiber interstitial areas, again dependent upon system geometry. And while the two embodiments have disclosed, as the image projection elements, gradient index optical fibers and arrays of triplet microlenses (strip lens), other short focal length, two-dimensional light transmitting elements may be used, such as for example, arrays of thick lenses which produce erect images; e.g. the imaging systems disclosed in U.S. Pat. No. 4,168,900. For purposes of this invention, short focal optical lenses, would have a total conjugate ranging from 5 to 150 mm.

For a typical FIG. 1 configuration, gradient index fiber 20 diameters would be in the order of 1 mm, and inter-fiber spacing in the order of 0.1 mm. Low irradiance modulation, say in the order of 2%, can be accomplished by maintaining an overlap parameter (a) to spacing factor (b) at least equal to 3. The terms a and b are derived for a given system as disclosed in U.S. Pat. No. 4,373,780 whose contents are hereby incorporated by reference.

Figure 5:
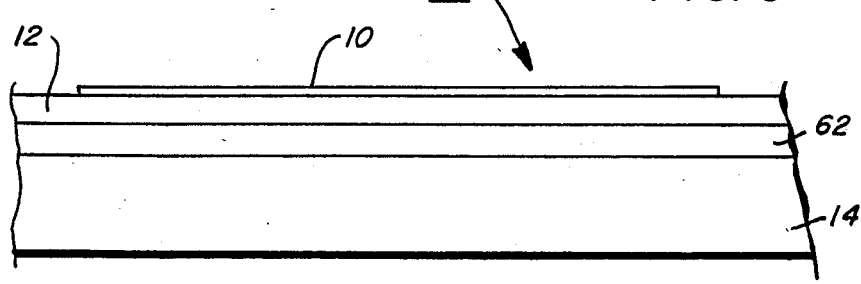
FIG. 5 shows a modification of FIG. 1 wherein the platen and lens array are formed as a modular unit.

Referring now to FIG. 5, there is shown a modified version of the FIG. 1 embodiment wherein the platen 12 and array 14 are combined into an integral modular assembly 60. A transparent layer 62 is formed between the platen and the lens array with a thickness designed to provide the appropriate lens to object ($l_o$) spacing and to yield the desired degree of illumination uniformity. $l_o$ is chosen to provide uniform illumination of the document. This configuration has the advantages of imparting a high degree of modularity to any system. For example, the entire optical system can be tested as a single unit on a work bench and then dropped onto locating pads in the machine. This concept can also be used to change the magnification of the particular reproduction device. As is known from U.S. Pat. No. 4,331,380, gradient index lens arrays can be designed to provide a given reduction/enlargement ratio. The system magnification can be changed by replacing, for example, a 1:1 platen/imaging assembly with an assembly of a different magnification, e.g. a 0.707 reduction assembly with the platen to array spacing adjusted accordingly. This change can be implemented by an operator.

Other variations of light sources, not forming part of the invention, are to introduce light from an exterior source onto the interstitial areas of the lens face by means of a series of light pipes connected between the external light source and the lens array face. A second method would be to contour and add a specular reflective surface to the array surface to create small mirror elements to reflect light from a lamp exterior to the array. The angle of micro-mirrors is a function of position in the array.

It is understood that further variations may be substituted into the above-described embodiments. For example, the FIGS. 1 and 4 lens arrays could be interchanged without departing from the spirit of the invention. All such variations are intended to be encompassed by the following claims.

What is claimed is:

1. An imaging system for transmitting an image of a document at an object plane onto a photosensitive image plane, the system including a full-frame imaging and illumination device positioned between said object and image planes, said device comprising:

a plurality of short focal length lens elements assembled to form a full-frame lens array, a light source positioned in at least some of the interstitial spaces separating said lens elements and on the surface of the array adjacent said object plane, and means to activate said light source whereby light produced by said light source is directed to said document, reflected therefrom and projected by said lens array onto said image plane to form a latent image of said document on said image plane.

2. The imaging system of claim 1 wherein said lens elements are gradient index optical fibers.

3. The imaging system of claim 1 wherein said lens elements are a plurality of homogeneous, triplet microlens segments combined in layers to form a "strip lens".

4. The imaging system of claim 1 wherein said lens elements are a plurality of thick lenses.

5. The imaging system of claim 1 wherein said light source is an electroluminescent layer formed in said interstitial areas.

6. The imaging system of claim 1 wherein said light source is a matrix of light-emitting diodes positioned in said interstitial areas.

7. The imaging system of claim 1 wherein said object plane consists of a transparent glass platen and wherein said imaging and illumination device is formed integral with said platen.

8. The imaging system of claim 1 wherein said lens elements form an image at a magnification of less than unity.

9. The imaging system of claim 1 wherein the total conjugate of said full-frame lens array is between 5 and 150 mm.

10. A two-dimensional short focal length illuminator/lens array comprising:
a plurality of short focal length lens elements integrally assembled to form a lens array, said lens elements separated from each other by interstitial areas, and
a light source formed within said interstitial areas.

11. The illuminator/lens array of claim 10 wherein said light source comprises an electroluminescent layer.

* * * * *